United States Patent
Low et al.

(10) Patent No.: US 7,467,240 B2
(45) Date of Patent: Dec. 16, 2008

(54) SERIAL HOST INTERFACE GENERATES INDEX WORD THAT INDICATES WHETHER OPERATION IS READ OR WRITE OPERATION

(75) Inventors: Yun Shon Low, Richmond (CA); Raymond Chow, Richmond (CA)

(73) Assignee: Seiko Epson Corporation, Tokyo (JP)

( * ) Notice: Subject to any disclaimer, the term of this patent is extended or adjusted under 35 U.S.C. 154(b) by 515 days.

(21) Appl. No.: 11/060,515

(22) Filed: Feb. 17, 2005

(65) Prior Publication Data

US 2006/0212605 A1 Sep. 21, 2006

(51) Int. Cl.
*G06F 13/00* (2006.01)

(52) U.S. Cl. ....................................... 710/33
(58) Field of Classification Search .............. 710/33
See application file for complete search history.

(56) References Cited

U.S. PATENT DOCUMENTS

| | | | |
|---|---|---|---|
| 5,886,658 A | 3/1999 | Amar et al. | |
| 5,953,511 A * | 9/1999 | Sescila et al. | 710/315 |
| 6,018,779 A * | 1/2000 | Blumenau | 710/68 |
| 6,253,259 B1 | 6/2001 | Hirabayashi et al. | |
| 6,412,023 B1 | 6/2002 | Hirabayashi et al. | |
| 6,414,689 B1 * | 7/2002 | Wu | 345/558 |
| 6,427,197 B1 | 7/2002 | Sato et al. | |
| 6,496,879 B2 | 12/2002 | Hirabayashi et al. | |
| 6,681,269 B2 | 1/2004 | Hirabayashi et al. | |
| 7,068,253 B2 * | 6/2006 | Kudo et al. | 345/99 |
| 2003/0056035 A1 | 3/2003 | Rai et al. | |
| 2003/0200359 A1 | 10/2003 | Fernald | |
| 2005/0055496 A1 * | 3/2005 | Nallapa | 711/103 |

* cited by examiner

*Primary Examiner*—Niketa I Patel
*Assistant Examiner*—Brooke J Dews
(74) *Attorney, Agent, or Firm*—Mark P. Watson (57) ABSTRACT

Data throughput of the serial host interface is improved by combining command and register address data into a single index word to be transmitted through the serial host interface. The least significant bit (LSB) of the index word specifies the command and the remainder of the index word specifies the register address. Thus, transmission of just two words is required to transmit each of a single write data word and a single read data word. Additionally, the serial host interface provides for elimination of the dummy access word as required when performing a read transmission using a conventional serial host interface protocol.

4 Claims, 9 Drawing Sheets

SERIAL HOST INTERFACE GENERATES INDEX WORD THAT INDICATES WHETHER OPERATION IS READ OR WRITE OPERATION

BACKGROUND OF THE INVENTION

1. Field of the Invention

The present invention relates generally to data communication between computing devices.

2. Description of the Related Art

In modern embedded computing systems, it is common for a processor to interface with an external device using a serial interface. The serial interface provides for reduced complexity of printed circuit board signal routing, fewer electromagnetic interference issues, and fewer issues associated with signal integrity. However, the serial interface can be performance limiting due to the serial nature of the data transmission through the serial interface. Thus, a need continually persists for advancements in serial interface technology to improve performance with respect to data throughput.

SUMMARY OF THE INVENTION

In one embodiment, a serial interface for conducting a data transmission operation between a processor and an external device is disclosed. The serial interface includes an input line for transmitting sequential words of data from the processor to the external device. Each of the sequential words of data is defined by a fixed number of bits extending from a most significant bit (MSB) to a least significant bit (LSB). A portion of the serial interface disposed within the processor represents index word generation logic defined to generate an index word of the data transmission operation. A LSB of the index word indicates whether the data transmission operation is a read operation or a write operation. A portion of the index word other than the LSB specifies an address for the data transmission operation.

In another embodiment, a method for operating a serial interface to transmit data between a processor and an external device is disclosed. The method includes an operation for generating an index word to include both an address portion and a transmission type indicator. The index word is transmitted from the processor to the external device. An operation is then performed to process the address portion to determine an address in memory to be accessed. The method further includes an operation for processing the transmission type indicator to determine if the current transmission is a write transmission or a read transmission. The processing of the transmission type indicator is performed subsequent to the processing of the address portion.

In another embodiment, a serial interface protocol is disclosed. Within the serial interface protocol, an index word is defined to include both address data and a transmission command. The index word is to be transmitted on an input transmission line. The serial interface protocol also includes one or more words of data to be transmitted following transmission of the index word. The serial interface protocol further includes a command signal to be transmitted on a command signal line. The command signal is defined to indicate transmission of the index word.

Other aspects of the invention will become more apparent from the following detailed description, taken in conjunction with the accompanying drawings, illustrating by way of example the present invention.

BRIEF DESCRIPTION OF THE DRAWINGS

The invention, together with further advantages thereof, may best be understood by reference to the following description taken in conjunction with the accompanying drawings in which.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Figure 1:
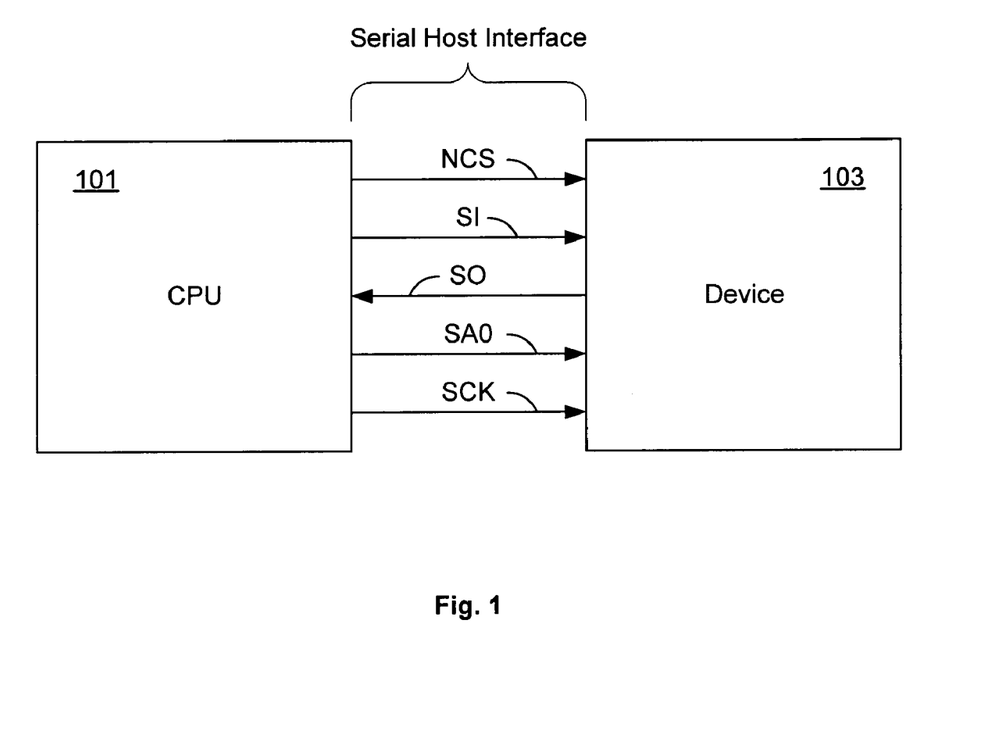
FIG. 1 is an illustration showing a serial host interface, in accordance with one embodiment of the present invention.

FIG. 1 is an illustration showing a serial host interface, in accordance with one embodiment of the present invention. The serial host interface is defined between a processor (CPU) 101 and a device 103 external to the processor 101. The serial host interface includes a chip select line (NCS), a data input line (SI), a data output line (SO), a command signal line (SAO), and a clock signal line (SCK). In one embodiment, the serial host interface is defined as a 16-bit serial interface for serially transmitting words of data that are each defined by 16 bits. However, it should be appreciated that in other embodiments the serial host interface can be defined as a different size, e.g., 8-bit, 32-bit, 64-bit, etc. Furthermore, it should be appreciated that the device 103 can represent any device required to communicate with the processor using a serial interface. For example, in one embodiment the device 103 is a graphics accelerator module, wherein both the processor 101 and the graphics accelerator are defined within a portable electronic device such as a cell phone.

The chip select line (NCS) is used to communicate a chip select signal from the processor 101 to the device 103. The chip select signal controls selection of the device 103 and enablement of the serial host interface. For example, when the chip select signal is driven low, the device 103 is selected and the serial host interface is enabled. In one embodiment, the chip select signal must be driven from high to low prior to transmission of a command signal on the command signal line (SA0). Additionally, in one embodiment the chip select signal is held low during transmission of the command/data over the serial host interface.

The command signal line (SA0) is used to communicate a command/data identifier signal from the processor 101 to the device 103. More specifically, a command identifier signal will be transmitted on the command signal line (SA0) when command data is to be transmitted on the data input line (SI). Also, a data identifier signal will be transmitted on the command signal line (SA0) when data is to be transmitted on either the data input line (SI) or the data output line (SO). In one embodiment, a low signal is used as the command identifier signal and a high signal is used as the data identifier signal. Thus, when command data is to be transmitted on the data input line (SI), the signal on the command signal line will be low. Conversely, when data is to be transmitted on either the data input line (SI) or the data output line (SO), the signal on the command signal line will be high. The device 103 is configured to interpret the data on the data input line (SI) in accordance with the command/data identifier signal received on the command signal line (SA0).

The data input line (SI) is used to communicate command data, address data, and write data from the processor 101 to the device 103. In a conventional serial host interface protocol, the command data, address data, and write data are transmitted separately from one another over the data input line (SI). The command data specifies a command to be performed by the device 103, e.g., a write command, a read command, or a read end command. The address data specifies an address in memory to be accessed when executing the command. The write data represents data to be written to a memory within the device 103. The data output line (SO) is used to communicate read data from the device 103 to the processor 101. The read data represents data to be read from a memory within the device 103 and transmitted to the processor 101.

The clock signal line (SCK) is used to transmit a clock signal for coordinating the various signal transmissions on the command signal line (SA0), the data input line (SI), and the data output line (SO). The clock signal is also used by the processor 101 and the device 103 to enable synchronization with the serial host interface. As previously mentioned the serial host interface is defined as a fixed bit width interface, e.g., 8-bit, 16-bit, 32-bit, 64-bit, etc. The fixed bit width represents a number of bits transmitted over the serial host interface to define each transmission word. For example, in a 16-bit interface, each word is defined by 16 bits extending from a most significant bit (MSB) to a least significant bit (LSB). Thus, each transmission word represents a transmission of 16 bits. The clock signal is defined to cycle once for each bit transmitted over the serial host interface. Therefore, the clock signal will cycle 16 times to transmit a single transmission word over the 16-bit serial host interface. In one embodiment, a bit of data is transmitted at each falling edge of the clock signal.

Figure 2:
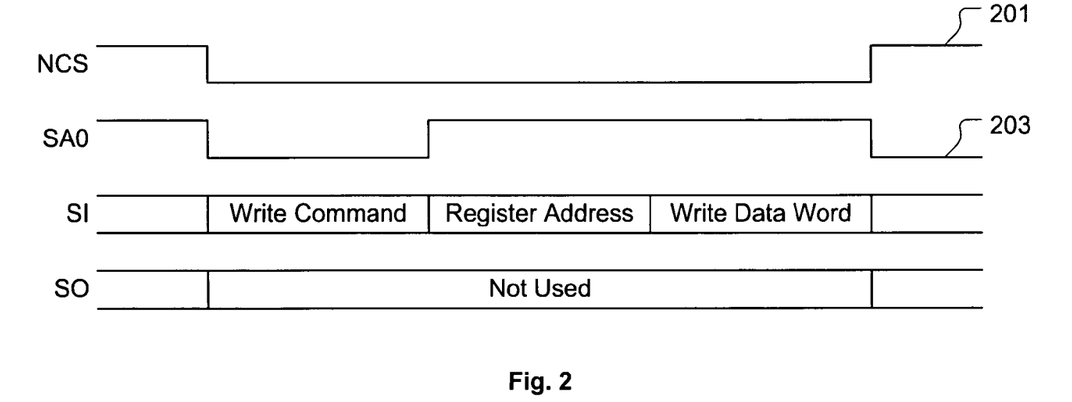
FIG. 2 is an illustration of a timing diagram for transmitting a single write data word over the serial host interface of FIG. 1, in accordance with a conventional serial host interface protocol.

FIG. 2 is an illustration of a timing diagram for transmitting a single write data word over the serial host interface of FIG. 1, in accordance with a conventional serial host interface protocol. The chip select signal 201 transmitted on the chip select line (NCS) is driven low to enable the serial host interface. In the embodiment of FIG. 2, a low command/data identifier signal 203 on the command signal line (SA0) is used to indicate that the transmission immediately following on the data input line (SI) is a command. Thus, the command/data identifier signal 203 is driven low on the command signal line (SA0) upon transmission of the write command on the data input line (SI). The low signal on the command signal line (SA0) directs the receiving device to interpret the incoming write command as a word of data representing a command.

Transition of the command/data identifier signal 203 from low to high upon completion of the write command transmission indicates that the transmission immediately following on the data input line (SI) represents data rather than a command. The conventional serial host interface protocol requires transmission of a register address immediately following the write command transmission. The register address represents a register address value which specifies an address in a memory of the receiving device at which the write operation is to commence. The conventional serial host interface protocol further requires transmission of the data to be written following transmission of the register address.

Since the example of FIG. 2 is concerned with transmission of a single write data word, a single write data word is transmitted on the data input line (SI) following the register address transmission. As discussed above, transmission of a single write data word in accordance with the conventional serial host interface protocol requires transmission of at least the following three words of data: 1) a write command, 2) a register address, and 3) a write data word.

Figure 3:
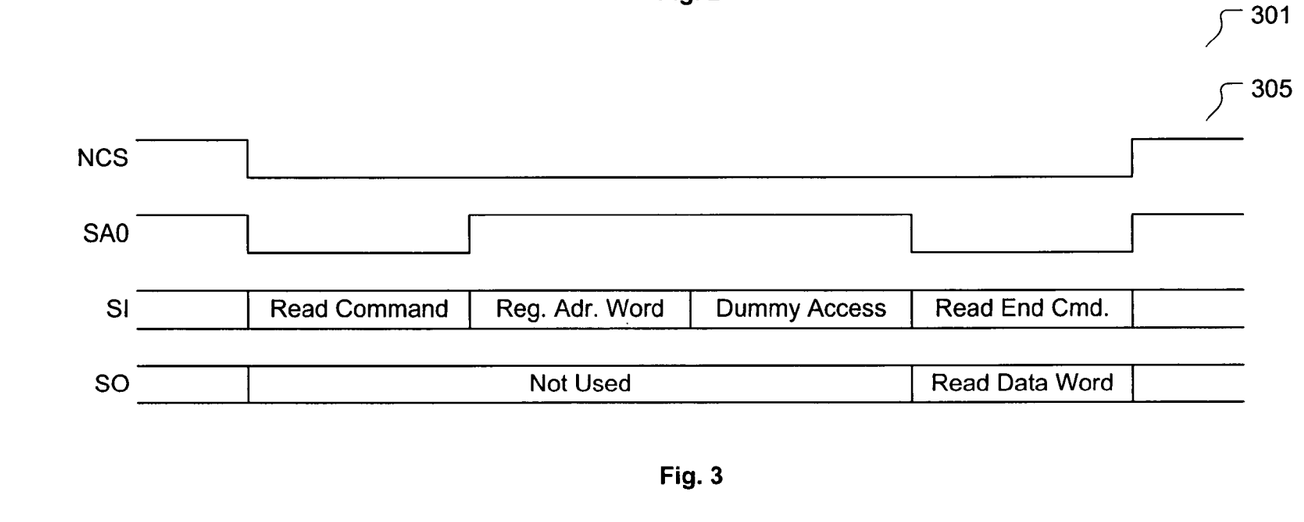
FIG. 3 is an illustration of a timing diagram for transmitting a single read data word over the serial host interface of FIG. 1, in accordance with a conventional serial host interface protocol.

FIG. 3 is an illustration of a timing diagram for transmitting a single read data word over the serial host interface of FIG. 1, in accordance with a conventional serial host interface protocol. The chip select signal 301 transmitted on the chip select line (NCS) is driven low to enable the serial host interface. In the embodiment of FIG. 3, a low command/data identifier signal 305 on the command signal line (SA0) is used to indicate that the transmission immediately following on the data input line (SI) is a command. Thus, the command/data identifier signal 305 is driven low on the command signal line (SA0) upon transmission of the read command on the data input line (SI). The low signal on the command signal line (SA0) directs the receiving device to interpret the incoming read command as a word of data representing a command.

Transition of the command/data identifier signal 305 from low to high upon completion of the read command transmission indicates that the transmission immediately following on the data input line (SI) represents data rather than a command. The conventional serial host interface protocol requires transmission of a register address immediately following the read command transmission. The register address represents a register address value which specifies an address in a memory of the receiving device at which the read operation is to commence. The conventional serial host interface protocol further requires transmission of a dummy access word following transmission of the register address. During transmission of the dummy access word, the device is able to retrieve, i.e., pre-fetch, data from the memory location corresponding to the transmitted register address value. Thus, the retrieved data is available for transmission on the data output line (SO) immediately following the dummy access word transmission.

Since the example of FIG. 3 is concerned with transmission of a single read data word, a single read data word is transmitted on the data output line (SO) following the dummy access word transmission. Additionally, a read end command is transmitted on the data input line (SI) simultaneously with transmission of the single read data word on the data output line (SO). The command/data identifier signal 305 on the command signal line (SA0) transitions from high to low prior to transmission of the read end command to indicate that the transmission immediately following on the data input line (SI) is a command. The read end command notifies the device that the read operation is completed and no further read data needs to be retrieved, i.e., pre-fetched, from memory.

As discussed above, transmission of a single read data word in accordance with the conventional serial host interface protocol requires transmission of at least the following four words: 1) a read command, 2) a register address, 3) a dummy access word, and 4) a read data word in conjunction with a read end command.

As discussed above, the minimum number of transmission words required to perform a write operation and a read operation is three and four, respectively, using the conventional serial host interface protocol. In many situations, there may be a need to write several blocks of registers before initiating an operation, e.g., writing Joint Photographic Experts Group (JPEG) Compressor-Decompressor (CODEC) Quantization or Compression Tables. For example, each time a JPEG encode operation is to be performed up to 725 registers are required to be programmed. Due to the serial nature of the data transmission using the conventional serial host interface protocol, transmission of the data for programming the 725 registers can be costly in terms of speed and power consumption. Through the embodiments discussed below, the speed of data transmissions over the serial host interface is improved.

The enhanced serial host interface of the present invention improves data throughput by combining the command and register address words into a single index word to be transmitted, regardless of whether a write or a read transmission is to be performed. Additionally, the enhanced serial host interface provides for elimination of the dummy access word required when performing a read transmission using the conventional serial host interface protocol, as previously discussed. Therefore, the enhanced serial host interface requires transmission of just two words to transmit a single write data word, i.e., an index word representing combined command and address information and a write data word, as opposed to transmission of three words as required by the conventional serial host interface protocol. Furthermore, the enhanced serial host interface requires transmission of just two words to transmit a single read data word, i.e., an index cycle representing combined command and address information and a read data word, as opposed to transmission of four words as required by the conventional serial host interface protocol. It should be appreciated that the enhanced serial host interface includes both a protocol and hardware configured to implement the protocol.

Figure 4A:
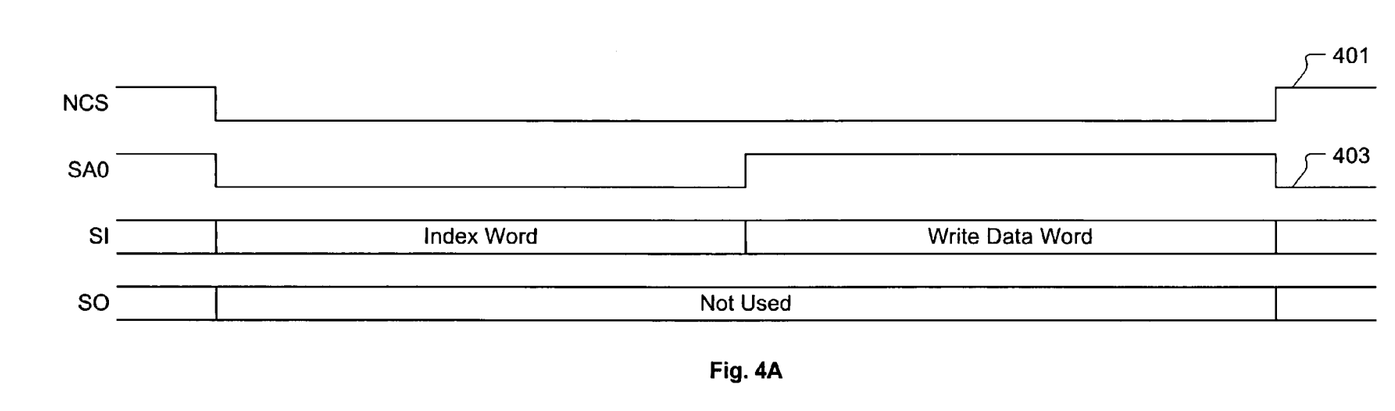
FIG. 4A is an illustration of a timing diagram for transmitting a single write data word using the enhanced serial host interface, in accordance with one embodiment of the present invention.

FIG. 4A is an illustration of a timing diagram for transmitting a single write data word using the enhanced serial host interface, in accordance with one embodiment of the present invention. The chip select signal 401 transmitted on the chip select line (NCS) is driven low to enable the enhanced serial host interface. In the embodiment of FIG. 4A, a low command/data identifier signal 403 on the command signal line (SA0) is used to indicate that the transmission immediately following on the data input line (SI) is an index word. Thus, the command/data identifier signal 403 is driven low on the command signal line (SA0) upon transmission of the index word on the data input line (SI). The low signal on the command signal line (SA0) directs the receiving device to interpret the incoming transmission as the index word including both address data and command data. In one embodiment, the enhanced serial host interface is a 16-bit interface, wherein each transmission word is defined by transmission of 16 bits in order from the MSB to the LSB. In this embodiment, the address portion of the index word is transmitted in the first 15 bits of the index word, i.e., the MSB through a bit adjacent to the LSB. Additionally, the LSB of the index word represents the command data. In one embodiment, a low signal for the LSB indicates that a write operation is to be performed. Conversely, a high signal for the LSB indicates that a read operation is to be performed. Thus, in the example of FIG. 4A, the LSB of the index word will be a low signal to indicate the write operation. It should be appreciated that low and high signal assignments for the write and read operations, respectively, can be reversed in other embodiments of the enhanced serial host interface, so long as it is understood which states of the LSB correspond to the write and read operations. For discussion purposes, the remainder of the present description will assume that a low LSB signal represents a write operation, and a high LSB signal represents a read operation.

Once the index word is transmitted, the command/data identifier signal 403 transitions from low to high to indicate that the transmission immediately following on the data input line (SI) represents data rather than an index word. Accordingly, a write data word is transmitted on the data input line (SI) following the index word. It should be understood that the data output line (SO) is not involved in performing a write operation over the enhanced serial host interface.

Figure 4B:
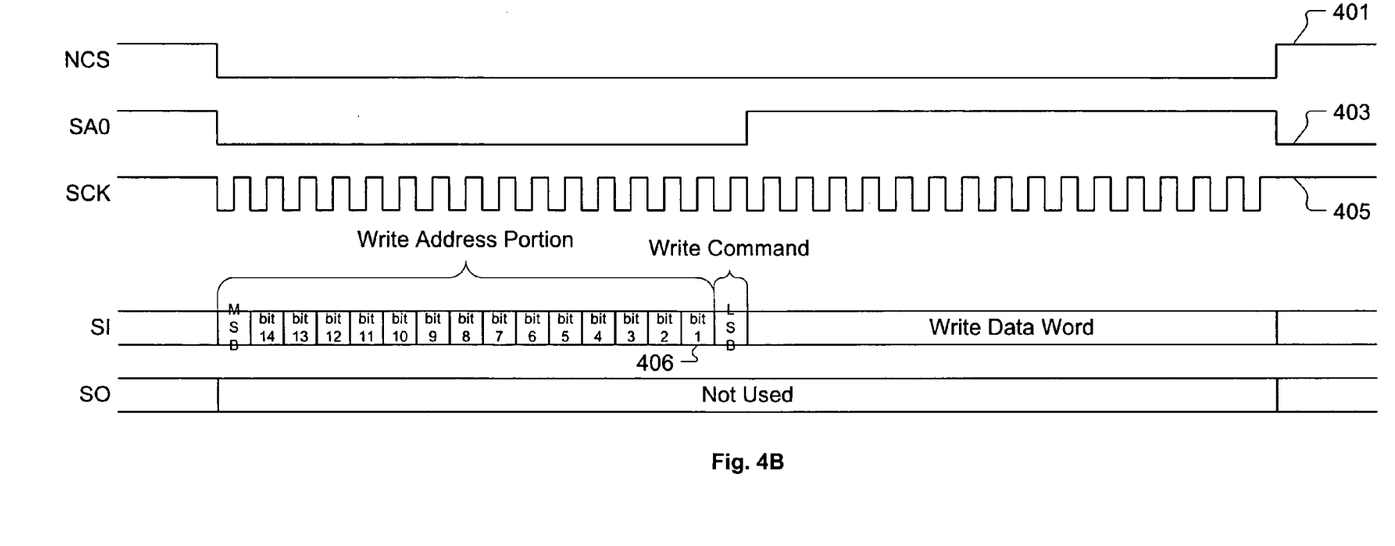
FIG. 4B is an illustration showing the timing diagram of FIG. 4A including a detailed representation of the index word content, in accordance with one embodiment of the present invention.

FIG. 4B is an illustration showing the timing diagram of FIG. 4A including a detailed representation of the index word content, in accordance with one embodiment of the present invention. Transmissions and coordination thereof over the chip select line (NCS), the command signal line (SA0), the data input line (SI), and the data output line (SO) are the same as previously discussed with respect to FIG. 4A. However, FIG. 4B shows the bit-wise transmission of the index word. As previously discussed, the index word is transmitted in bit sequence beginning with the MSB and ending with the LSB. The MSB through bit 1, i.e., MSB through bit 1 (406), represents the address portion of the index word specifying an address in memory at which the write operation is to commence. The LSB of the index word specifies that a write operation is to be performed. It should be appreciated that each bit of the transmission is transmitted in accordance with the clock signal 405 provided on the clock signal line (SCK). In the embodiment of FIG. 4B, each bit is transmitted at a falling edge of the clock signal 405. It should be appreciated, however, that other embodiments can coordinate bit-wise transmission with a different portion of the clock signal 405. The address portion of the index word is processed such that upon recognizing the LSB as representing the write command, the write data word immediately following the index word can be written into memory at the appropriate address location.

As discussed above, transmission of a single write data word in accordance with the enhanced serial host interface protocol requires transmission of two words of data: 1) an index word, and 2) a write data word. Therefore, the enhanced serial host interface allows for saving at least one transmission word for each write operation relative to the conventional serial host interface protocol.

Figure 4C:
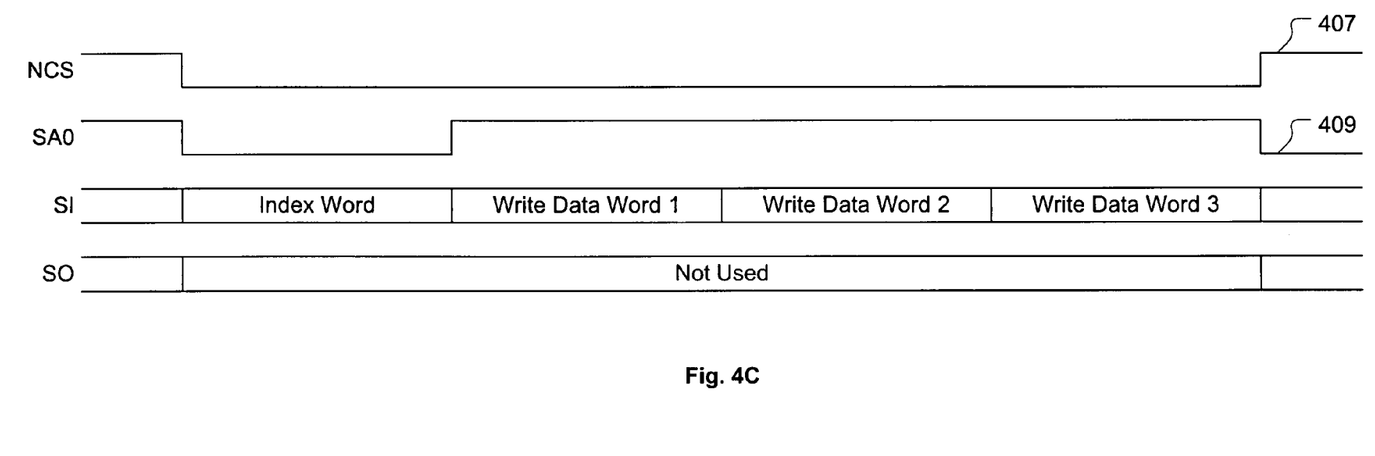
FIG. 4C is an illustration of a timing diagram for transmitting a serial burst of write data using the enhanced serial host interface, in accordance with one embodiment of the present invention.

FIG. 4C is an illustration of a timing diagram for transmitting a serial burst of write data using the enhanced serial host interface, in accordance with one embodiment of the present invention. As previously discussed with respect to FIG. 4A, a chip select signal 407 on the chip select line (NCS) is driven low to enable the enhanced serial host interface. Additionally, a command/data identifier signal 409 on the command signal line (SA0) is driven low to signify transmission of the index word and is driven high to signify transmission of write data. The data output line (SO) is not involved in performing the serial burst write operation. The data input line (SI) is used to transmit the index word and the write data words corresponding to the serial burst of write data. The index word structure and associated processing is the same as previously discussed with respect to FIG. 4A. The address portion of the index word specifies the address in memory at which the write operation is to commence. More specifically, the write data word immediately following the index word, i.e., Write Data Word 1, is written to memory starting at the address specified by the address portion of the index word. Each of the subsequently transmitted write data words, i.e., Write Data Word 2, Write Data Word 3, etc., are directed to an appropriate address location in memory based upon successive incrementation of the address initially transmitted in the index word. More specifically, the address initially transmitted in the index word is incremented by two for storage of each successively transmitted write data word. Therefore, a device register addressing scheme for 8-bit registers should be limited to even addresses. Additionally, for 16-bit or larger devices, register accesses should be limited to 16-bit word alignment, i.e., even addresses.

Figure 5A:
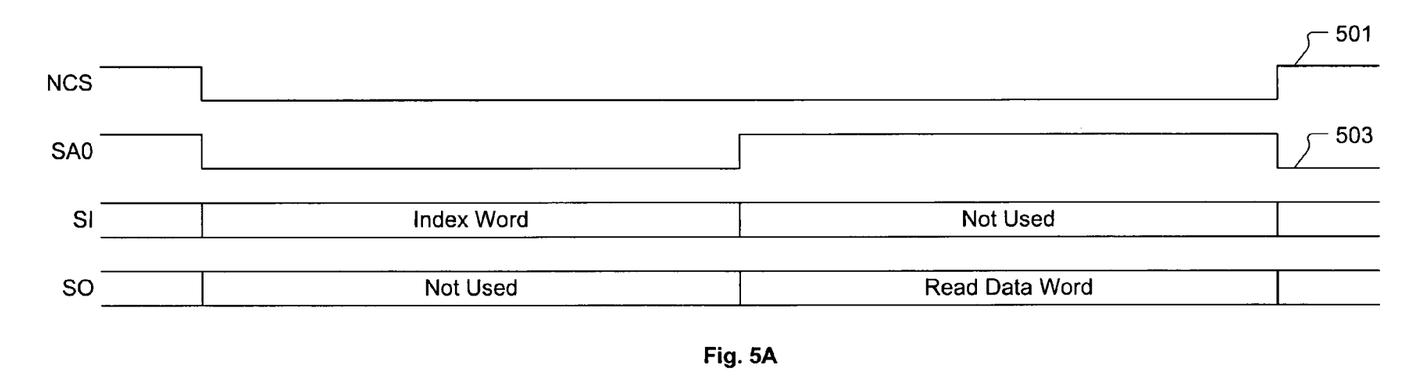
FIG. 5A is an illustration of a timing diagram for transmitting a single read data word using the enhanced serial host interface, in accordance with one embodiment of the present invention.

FIG. 5A is an illustration of a timing diagram for transmitting a single read data word using the enhanced serial host interface, in accordance with one embodiment of the present invention. A chip select signal 501 transmitted on the chip select line (NCS) is driven low to enable the enhanced serial host interface. In the embodiment of FIG. 5A, a low command/data identifier signal 503 on the command signal line (SA0) is used to indicate that the transmission immediately following on the data input line (SI) is an index word. Thus, the command/data identifier signal 503 is driven low on the command signal line (SA0) upon transmission of the index word on the data input line (SI). The low signal on the command signal line (SA0) directs the receiving device to interpret the incoming transmission as the index word including both address data and command data. The index word structure is the same as previously described with respect to the single write data operation of FIG. 4A. Thus, the address portion of the index word is transmitted in the first 15 bits of the index word, i.e., the MSB through a bit adjacent to the LSB, and the LSB of the index word represents the command data. In one embodiment, a high signal for the LSB indicates that a read operation is to be performed. Thus, in the example of FIG. 5A, the LSB of the index word will be a high signal to indicate the read operation.

Once the index word is transmitted, the command/data identifier signal 503 transitions from low to high to indicate that the transmission immediately following on the data output line (SO) represents a word of read data. Accordingly, a read data word is transmitted on the data output line (SO) following the index word. It should be understood that the data input line (SI) is only required for transmission of the index word when performing the read operation over the enhanced serial host interface.

Figure 5B:
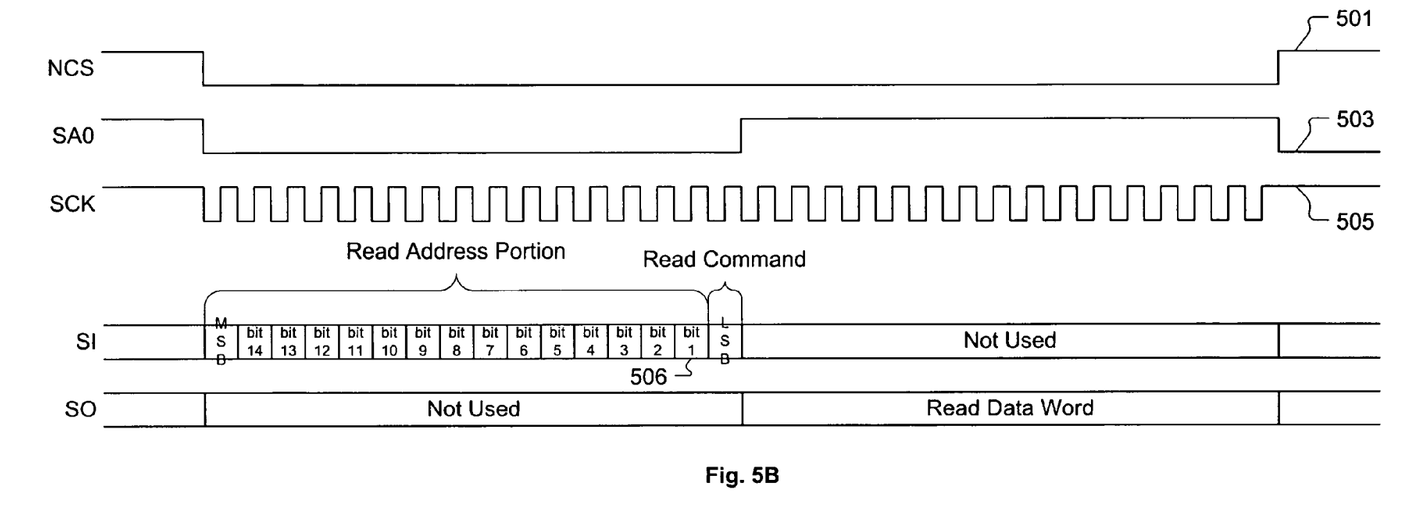
FIG. 5B is an illustration showing the timing diagram of FIG. 5A including a detailed representation of the index word content, in accordance with one embodiment of the present invention.

FIG. 5B is an illustration showing the timing diagram of FIG. 5A including a detailed representation of the index word content, in accordance with one embodiment of the present invention. Transmissions and coordination thereof over the chip select line (NCS), the command signal line (SA0), the data input line (SI), and the data output line (SO) are the same as previously discussed with respect to FIG. 5A. However, FIG. 5B shows the bit-wise transmission of the index word. As previously discussed, the index word is transmitted in bit sequence beginning with the MSB and ending with the LSB. The MSB through bit 1, i.e., MSB through bit 1 (506), represents the address portion of the index word specifying an address in memory at which the read operation is to commence. The LSB of the index word specifies that a read operation is to be performed. It should be appreciated that each bit of the transmission is transmitted in accordance with a clock signal 505 provided on the clock signal line (SCK). In the embodiment of FIG. 5B, each bit is transmitted at a falling edge of the clock signal 505. It should be appreciated, however, that other embodiments can coordinate bit-wise transmission with a different portion of the clock signal 505. Additionally, the address portion of the index word is processed such that during processing of the LSB of the index word, the data residing at the address indicated by the address portion of the index word is retrieved, i.e., pre-fetched. Thus, the data residing at the address indicated by the address portion of the index word is available for transmission on the data output line (SO) immediately following transmission of the LSB of the index word. It should be appreciated that pre-fetching the data during the single clock cycle required to transmit the LSB of the index word is possible because the pre-fetching operation is conducted in accordance with a processor clock signal of higher frequency relative to the clock signal 505 of the enhanced serial host interface.

As discussed above, transmission of a single read data word in accordance with the enhanced serial host interface protocol requires transmission of two words of data: 1) an index word, and 2) a read data word. Therefore, the enhanced serial host interface allows for saving at least three transmission words for each read operation relative to the conventional serial host interface protocol.

Figure 5C:
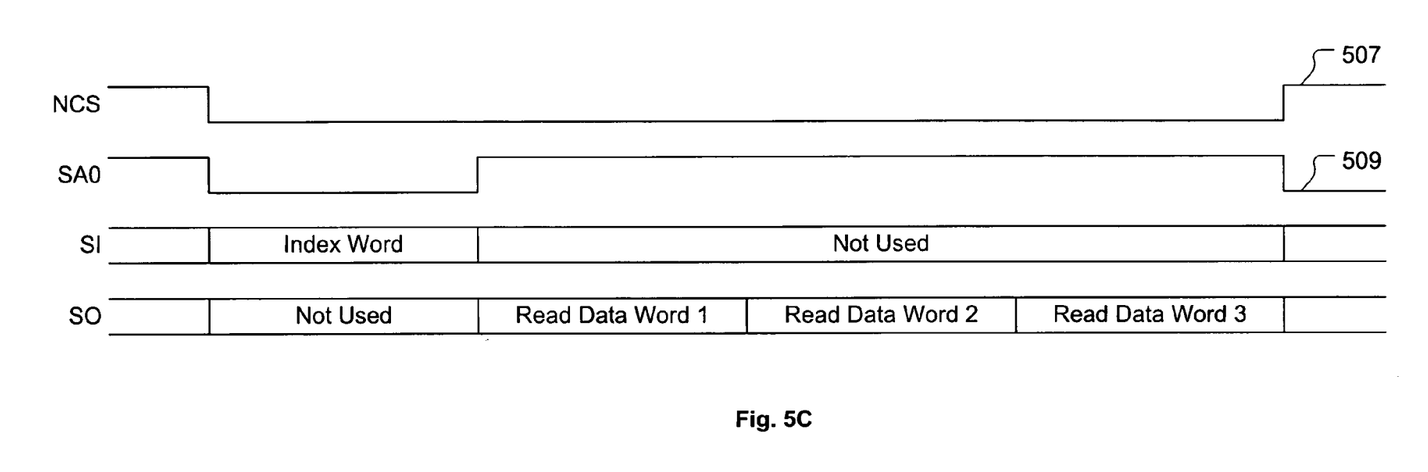
FIG. 5C is an illustration of a timing diagram for transmitting a serial burst of read data using the enhanced serial host interface, in accordance with one embodiment of the present invention.

FIG. 5C is an illustration of a timing diagram for transmitting a serial burst of read data using the enhanced serial host interface, in accordance with one embodiment of the present invention. As previously discussed with respect to FIG. 5A, the chip select signal 507 on the chip select line (NCS) is driven low to enable the enhanced serial host interface. Additionally, the command/data identifier signal 509 on the command signal line (SA0) is driven low to signify transmission of the index word and is driven high to signify transmission of read data. The data input line (SI) is used to transmit the index word, and the data output line (SO) is used to transmit the serial burst of read data. The index word structure and associated processing is the same as previously discussed with respect to FIG. 5A. The address portion of the index word specifies the address in memory at which the read operation is to commence. More specifically, the read data word immediately following the index word, i.e., Read Data Word 1, is read from memory starting at the address specified by the address portion of the index word. Each of the subsequently transmitted read data words, i.e., Read Data Word 2, Read Data Word 3, etc., is retrieved from an appropriate address location in memory based upon successive incrementation of the address initially transmitted in the index word. More specifically, the address initially transmitted in the index word is incremented by two for retrieval of each read data word to be successively transmitted over the enhanced serial interface. As previously mentioned, a device register addressing scheme for 8-bit registers should be limited to even addresses. Additionally, register accesses should be limited to 16-bit word alignment for 16-bit or larger devices. It should be further appreciated that data for each read data word to be transmitted is retrieved, i.e., pre-fetched, from memory during transmission of a previous read data word.

In the read operation of the enhanced serial host interface as previously described with respect to FIGS. 5A-5C, both the data input line (SI) and the data output line (SO) were involved in transmitting data. More specifically, the data input line (SI) is used to transmit the index word data from the processor to the external device. The data output line (SO) is used to transmit the read data words from the device to the processor. It should be appreciated that useful data is not transmitted simultaneously on both the data input line (SI) and the data output line (SO). In one embodiment, a single data line is used to transmit data in a bi-directional manner between the processor and the external device.

Figure 5D:
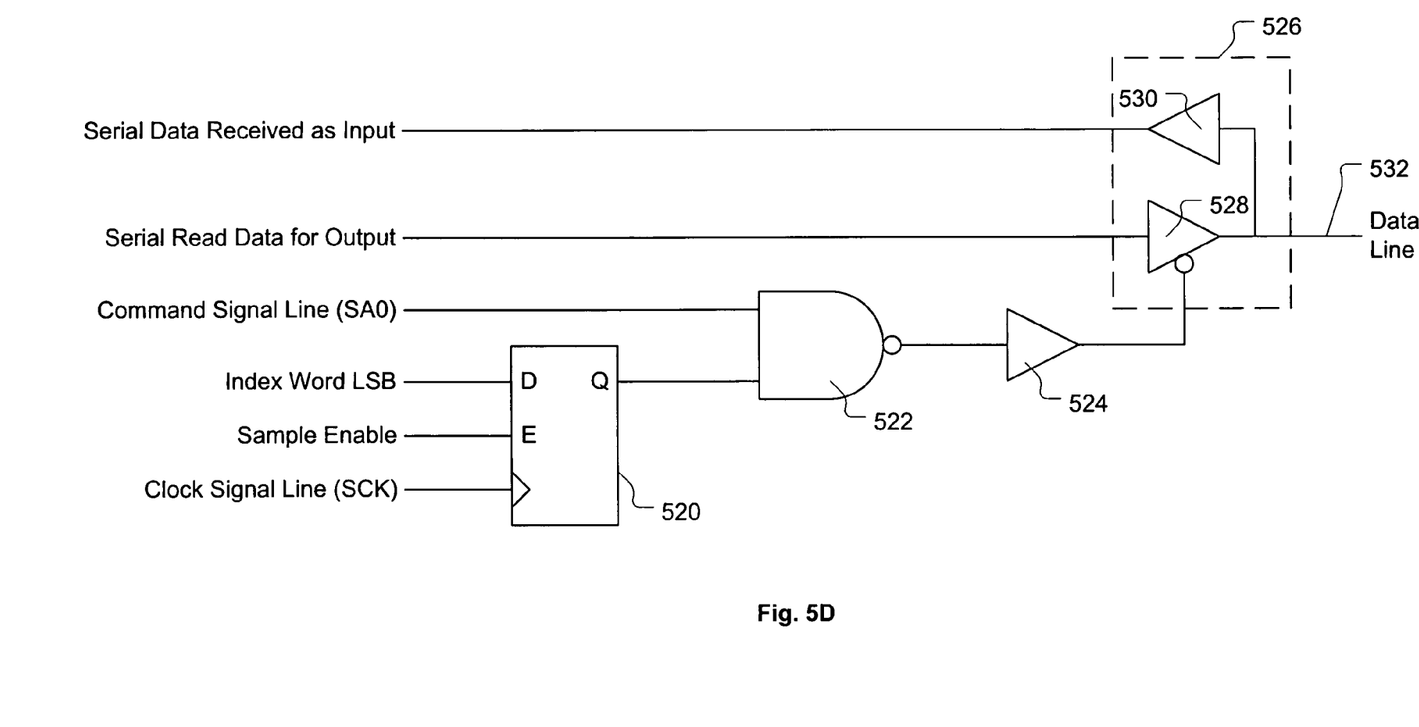
FIG. 5D is an illustration showing a logic diagram for implementing a single data line, in accordance with one embodiment of the present invention.

FIG. 5D is an illustration showing a logic diagram for implementing a single data line 532, in accordance with one embodiment of the present invention. A flip-flop 520 is provided for sampling the LSB of the index word on an input D in accordance with the serial clock (SCK) when an enable signal is active on an input E. The sampled LSB of the index word is output on Q from the flip-flop 520, and is in turn input to a NAND gate 522. The signal on the command signal line (SA0) is also provided as an input to the NAND gate 522. Thus, the NAND gate 522 serves to qualify whether the current transmission is a read transmission. If the current transmission is a read transmission, the output of the NAND gate 522 will be low. If the current transmission is a write transmission, the output of the NAND gate 522 will be high.

Depending on the particular logic configuration, additional delay logic 524 may be inserted to allow some turnaround time to avoid bus contention on the single data line 532. The output from the delay logic 524 is used as an enable signal for an output buffer 528 of input/output pad logic 526. In the configuration of FIG. 5D, the output buffer 528 is activated by an active low signal. Thus, a low signal output from the NAND gate 522 and delay logic 524 will enable the output buffer 528. Enablement of the output buffer 528 allows read data to be transmitted as output to the data line 532.

If the current transmission is a write transmission, the signal output from the NAND gate 522 and delay logic 524 will be high and the output buffer 528 will be disabled. Thus, data incoming on the data line 532 will be able to pass through an input buffer 530 of the input/output pad logic 526 without conflict.

Figure 6:
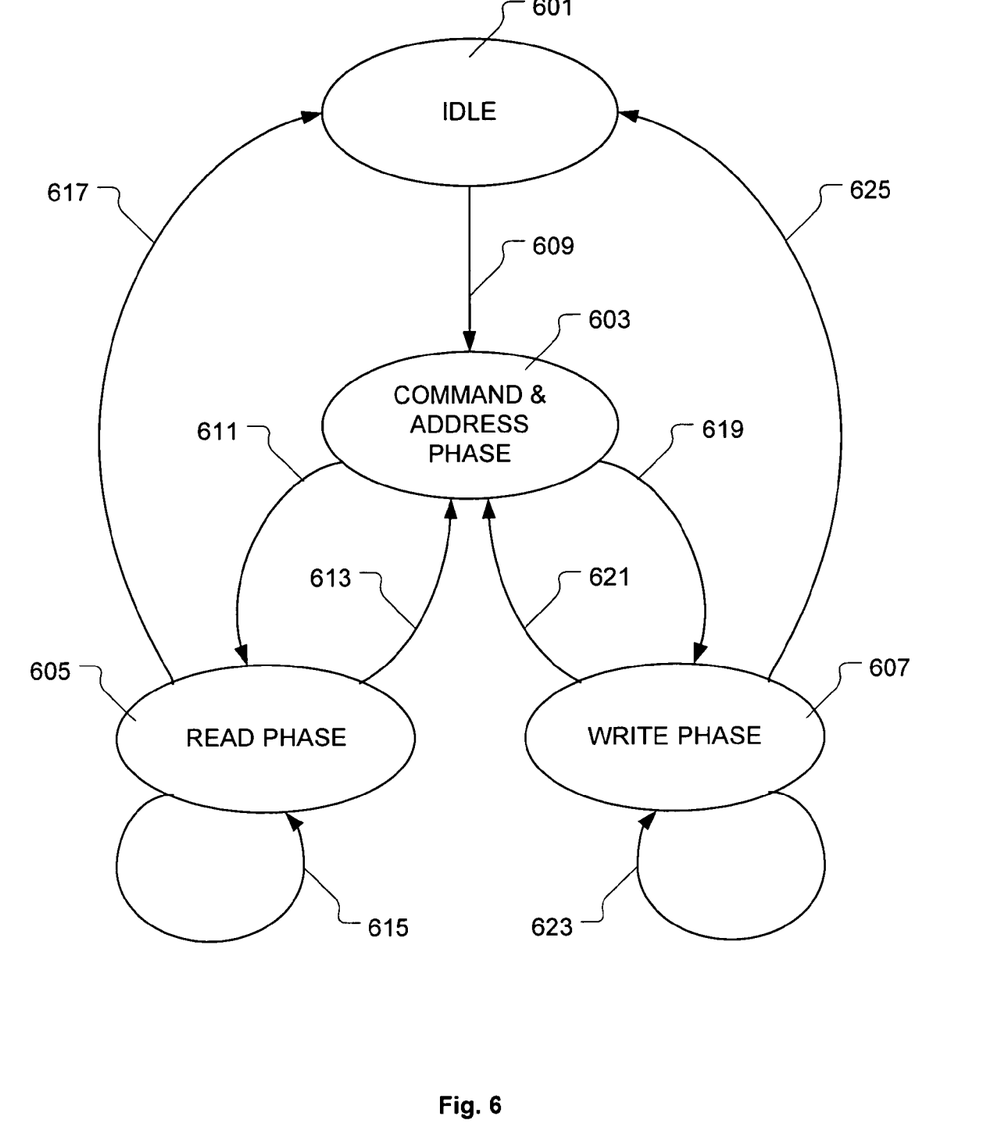
FIG. 6 is an illustration showing a state machine for operating the enhanced serial host interface, in accordance with one embodiment of the present invention.

FIG. 6 is an illustration showing a state machine for operating the enhanced serial host interface, in accordance with one embodiment of the present invention. The state machine includes an idle state 601 in which the enhanced serial host interface is not transmitting, i.e., the chip select signal is not asserted. Upon assertion of the chip select signal, the state machine is defined to transition from the idle state 601 to a command and address phase 603, as indicated by arrow 609. In the command and address phase 603, the index word is defined and transmitted as previously discussed. Each time the command and address phase 603 is entered, the state machine will set an address pointer to the register address indicated by the address portion of the index word, wherein the register address resides in a memory of the external device.

If the LSB of the index word is set to indicate a read operation, the command and address phase 603 will include pre-fetching of the appropriate read data from the external device memory at the address pointer and advance the address pointer to a next address location. Then, the state machine will transition from the command and address phase 603 to a read phase 605, as indicated by arrow 611. In the read phase 605, the read data is transmitted from the external device to the processor, data for a subsequent transmission is read from memory of the external device, and the address pointer is advanced to a next address location. If additional read data is to be transmitted, the read phase 605 will be repeated, as indicated by arrow 615. If the chip select signal is de-asserted, the state machine will transition from the read phase 605 to the idle phase 601, as indicated by arrow 617. However, if a new index word is to be transmitted, the state machine will transition from the read phase 605 to the command and address phase 603, as indicated by arrow 613.

If the LSB of the index word is set to indicate a write operation, the state machine will transition from the command and address phase 603 to a write phase 607, as indicated by arrow 619. In the write phase 607, data transmitted from the processor to the external device is written to the memory location indicated by the address pointer, and the address pointer is advanced to a next address location in memory. If additional data is to be written, the write phase 607 will be repeated, as indicated by arrow 623. If the chip select signal is de-asserted, the state machine will transition from the write phase 607 to the idle phase 601, as indicated by arrow 625. However, if a new index word is to be transmitted, the state machine will transition from the write phase 607 to the command and address phase 603, as indicated by arrow 621.

Figure 7:
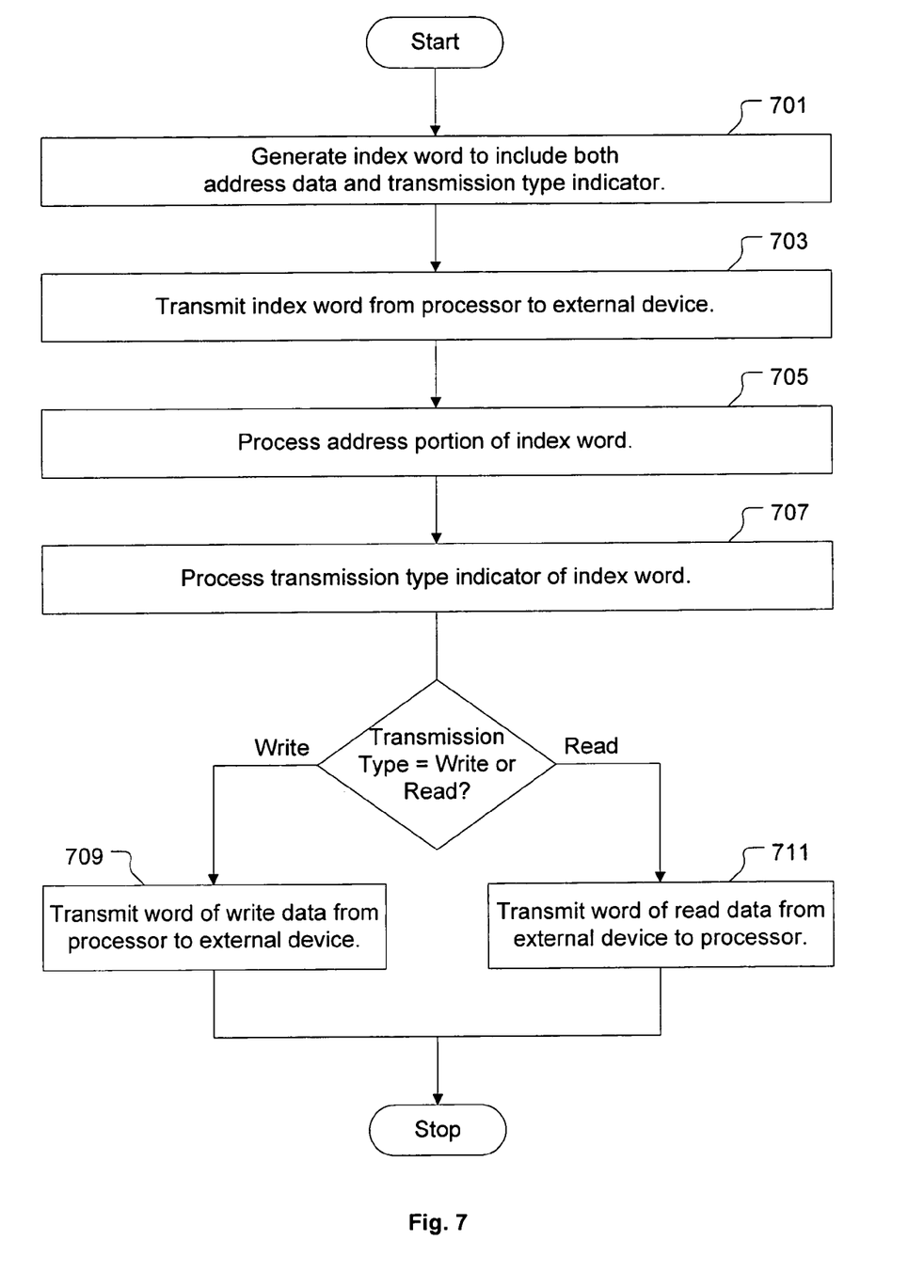
FIG. 7 is an illustration showing a flowchart of a method for operating a serial interface to transmit data between a processor and an external device, in accordance with one embodiment of the present invention.

FIG. 7 is an illustration showing a flowchart of a method for operating a serial interface to transmit data between a processor and an external device, in accordance with one embodiment of the present invention. The method includes an operation 701 for generating an index word to include both an address portion and a transmission type indicator. The transmission type indicator specifies whether the current transmission is to be a read transmission or a write transmission. The index word and each data word to be transmitted following the index word is defined by a fixed number of bits extending from an MSB to an LSB. In one embodiment, the LSB of the index word is used as the transmission type indicator, as illustrated in FIGS. 4A-5C. The method further includes an operation 703 for transmitting the index word from the processor to the external device. In one embodiment, a command signal is transmitted from the processor to the external device in parallel with transmitting the index word to indicate that the index word is being transmitted.

Once the index word is received at the external device, an operation 705 is performed to process the address portion of the index word to determine an address in memory to be accessed. Following processing of the address portion of the index word, an operation 707 is performed to process the transmission type indicator of the index word to determine if the current transmission is a write transmission or a read transmission. If the current transmission is a write transmission, an operation 709 is performed to transmit one or more words of write data from the processor to the external device. The transmitted words of write data are stored in the memory beginning at a storage address corresponding to the address portion of the index word. In one embodiment, the storage address is incremented by two for each successive word of write data to be stored in the memory.

If the current transmission is a read transmission, an operation 711 is performed to transmit one or more words of read data from the external device to the processor. The transmitted words of read data are obtained from the memory beginning at a storage address corresponding to the address portion of the index word. In one embodiment, a word of read data to be transmitted in conjunction with a clock cycle immediately following transmission of the transmission type indicator of the index word is obtained from memory during processing of the transmission type indicator of the index word. Additionally, in one embodiment, the storage address is incremented by two for each successive word of read data to be obtained from the memory.

In accordance with the foregoing, an enhanced serial interface for conducting a data transmission operation between a processor and an external device has been disclosed. The enhanced serial interface can be defined by the structure illustrated in FIG. 1. The enhanced serial interface includes an input line for transmitting sequential words of data from the processor to the external device. Each of the sequential words of data is defined by a fixed number of bits extending from a MSB to a LSB. The processor is defined to include index word generation logic for generating an index word of the data transmission operation. In one embodiment, an LSB of the index word indicates whether the data transmission operation is a read operation or a write operation. Additionally, a portion of the index word other than the LSB specifies an address for the data transmission operation.

The processor is further defined to include write data generation logic for generating one or more words of write data when the LSB of the index word is set to indicate a write operation. The words of write data are transmitted in a serial manner through the input line from the processor to the external device following transmission of the index word. The external device is defined to include write data processing logic for receiving the words of write data to be transmitted through the input line from the processor. The write data processing logic is further defined to place write data in a portion of memory beginning at the address specified in the index word.

The enhanced serial interface further includes an output line for transmitting read data from the external device to the processor. The external device includes read data generation logic for generating one or more words of read data when the LSB of the index word is set to indicate a read operation. The words of read data are transmitted in a serial manner through the output line from the external device to the processor. The read data generation logic is defined to obtain data from a memory of the external device at the address specified in the index word while simultaneously processing of the LSB of the index word, such that the data obtained from the memory is available for transmission through the output line in conjunction with a clock cycle immediately following completion of the index word transmission.

It should be appreciated that reduced data transmission requirements as afforded by the enhanced serial host interface of the present invention provides for increased data throughput and reduced power consumption. Thus, the present invention can be particularly useful when implemented in portable electronic devices where data transmission speed is important and processing power is at a premium. Some portable electronic devices that can benefit from the present invention include cell phones, PDAs, digital cameras, digital video recorders, and other handheld devices where a serial interface is used to connect one or more devices with a processor.

With the above embodiments in mind, it should be understood that the present invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations. Also, any of the operations described herein that form part of the invention can be performed by any suitable structural "means" that provide capability for performing the recited functionality. For instance, example structure is provided by way of the structural components described in the various embodiments of the claimed invention.

While this invention has been described in terms of several embodiments, it will be appreciated that those skilled in the art upon reading the preceding specifications and studying the drawings will realize various alterations, additions, permutations and equivalents thereof. It is therefore intended that the present invention includes all such alterations, additions, permutations, and equivalents as fall within the true spirit and scope of the invention.

The invention claimed is:

1. A serial interface for conducting a data transmission operation between a processor and an external device using a serial interface protocol, comprising:
    an input transmission line; and
    a command signal line; and wherein
    the serial interface protocol comprises:
        an index word including both address data and a transmission command, the index word to be transmitted on the input transmission line;
        one or more words of data to be transmitted following transmission of the index word; and
        a command signal to be transmitted on the command signal line, the command signal defined to indicate transmission of the index word, wherein an address corresponding to the address data is to be accessed during processing of a least significant bit (LSB) of the index word such that data residing at the address is available for transmission immediately following processing of the LSB of the index word.

2. The serial interface of claim 1, wherein the index word and the one or more words of data are each defined by a fixed number of bits extending from a most significant bit (MSB) to the least significant bit (LSB), the LSB of the index word specifying the transmission command, wherein the transmission command is either a read command or a write command, the bits of the index word other than the LSB specifying the address data.

3. The serial interface of claim 1, wherein the one or more words of data represent words of data to be written to a memory beginning at a storage address as indicated by the address data of the index word, the storage address being incremented by two for storage of each successive word of data to be transmitted.

4. The serial interface of claim 1, wherein the one or more words of data represent words of data to be read from a memory beginning at a storage address as indicated by the address data of the index word, the storage address being incremented by two for reading each successive word of data to be transmitted.

* * * * *